United States Patent
Cereo et al.

(10) Patent No.: US 6,246,515 B1
(45) Date of Patent: Jun. 12, 2001

(54) APPARATUS AND METHOD FOR AMPLIFYING AN OPTICAL SIGNAL

(75) Inventors: Richard J. Cereo, Beaver Dams; Shou-Jong Sheih, Millport, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/216,615

(22) Filed: Dec. 18, 1998

(51) Int. Cl.$^7$ ................................. G02B 6/28; H01S 3/30
(52) U.S. Cl. ..................... 359/345; 359/134; 359/160; 359/341
(58) Field of Search ..................................... 359/134, 160, 359/341, 345

(56) References Cited

U.S. PATENT DOCUMENTS

| | | | |
|---|---|---|---|
| 3,590,004 | 6/1971 | Woodcock et al. | 252/301.4 |
| 3,760,292 | 9/1973 | Kogelnik et al. | 331/94.5 |
| 3,786,365 | 1/1974 | Robison et al. | 331/94.5 |
| 4,554,510 | 11/1985 | Shaw et al. | 330/4.3 |
| 4,589,118 | 5/1986 | Suzuki et al. | 372/71 |
| 4,794,615 | 12/1988 | Berger et al. | 372/69 |
| 4,807,240 | 2/1989 | Goldstone | 372/69 |
| 4,964,131 | 10/1990 | Liu et al. | 372/6 |
| 5,005,115 | 4/1991 | Schauder | 363/159 |
| 5,140,456 | 8/1992 | Huber | 359/341 |
| 5,185,826 | * 2/1993 | Delavaux | 359/341 |
| 5,287,216 | * 2/1994 | Chirravuri et al. | 359/345 |
| 5,883,736 | * 3/1999 | Oshima et al. | 359/334 |

FOREIGN PATENT DOCUMENTS

| | | |
|---|---|---|
| 2195392 | 7/1997 | (CA) . |
| 508880 | * 7/1992 | (EP) . |
| 0 803 944 A2 | 10/1997 | (EP) . |
| 0 845 840 A2 | 6/1998 | (EP) . |
| 3-129330 | * 3/1991 | (JP) . |
| 3-92829 | * 3/1991 | (JP) . |
| 94/05061 | 3/1994 | (WO) . |

OTHER PUBLICATIONS

Aoki et al., "Efficient Backward & Forward Pumping CW Raman Amplification for InGaAsP Laser Light in Silica Fibres", Electronics Letters, 4$^{th}$ Aug. 1983, vol. 19, No. 16. pp. 620–622.

Sugawa et al., "10dB Gain 7 High Saturation Power in A Nd$^{3+}$–Doped Fluorozirconate Fibre Amplifier", Electronics Letters, 22$^{nd}$ Nov. 1990, vol. 26, No. 24, pp. 2042–2044.

Suzuki et al., "High Power Er+3—Doped Fiber Amplifier Pumped by 1.48 $\mu$m Laser Diodes" Japanese Journal of Applied Physics, vol. 29, No. 11, Nov. 1990, pp. L2067–L2069.

E. Desurvire, "Analysis of Noise Figure Spectral Distribution in Erbium Doped Fiber Amplifiers Pumped Near 980 and 1480 nm", Applied Optics, Jul. 20, 1990, vol. 29, No. 21, pp. 3118–3125.

* cited by examiner

*Primary Examiner*—Nelson Moskowitz
(74) *Attorney, Agent, or Firm*—Silvy Murphy

(57) ABSTRACT

An apparatus and method for amplifying an optical transmission signal having a wavelength of $\lambda_t$ in an optical fiber amplifier. The amplification segment of the optical fiber amplifier comprises a rare earth doped optical fiber having an input end and an output end, a first pump laser for generating a first pump light having a wavelength of $\lambda_1$, a second pump laser for generating a second pump light having a wavelength of $\lambda_2$, a first multiplexer having a first input port, a second input port, and an output port, a second multiplexer having a first input port, a second input port, and an output port, and a multiplexer/demultiplexer having two input ports and two output ports. The optical fiber amplifier utilizes the first pump light and the second pump light, each having substantially different wavelengths to simultaneously co-pump power into the input end of the rare earth doped optical fiber amplifier. Both the first pump light and the second pump light are propagated in the same direction as the optical transmission signal and into the input end of the rare earth doped optical fiber amplifier.

28 Claims, 3 Drawing Sheets

APPARATUS AND METHOD FOR AMPLIFYING AN OPTICAL SIGNAL

FIELD OF THE INVENTION

The present invention relates to optical fiber telecommunication systems and, in particular, to a rare earth doped optical fiber amplifier employed in such systems.

BACKGROUND INFORMATION

An optical transmission signal fades with distance when traveling through any type of optical fiber telecommunication system and, thus, needs amplification. In this regard, optical fiber amplifiers are used to transform a weak input optical transmission signal into a strong output optical transmission signal. Optical fiber amplifiers contain optical fibers with cores doped with certain rare earth elements, such as, erbium, that amplify light at certain wavelengths. The amplified wavelengths depend primarily on the rare earth dopant and on the fiber composition. Typically, a rare earth doped optical fiber amplifier utilizes a light source from an external laser, such as a semiconductor pump laser, to excite the dopant atoms in the optical fiber from a ground state to a higher energy level, whereby light from an optical transmission signal having a signal wavelength can stimulate these excited atoms to emit their excess energy as light at the signal wavelength, thus resulting in an amplified optical transmission signal. The degree of amplification depends on the excitation power input, as well as on the excitation wavelength. Standard erbium-doped fiber amplifiers amplify light having a wavelength in the range of about 1520 and 1610 nanometers and are usually pumped by commercially available semiconductor pump lasers that emit light at either 980 or 1480 nanometers. Typically, the 980 nanometer pump laser has an output power of about 165 milliwatts, whereas, the 1480 nanometer pump laser has an output power of about 140 milliwatts.

As communication distances are increased, it becomes necessary to increase the pump laser power to achieve a higher gain, which is the ratio of the output power to the input power in a rare earth doped optical fiber amplifier. The gain of a rare earth doped optical fiber amplifier depends on pump absorption, among other factors. Pump absorption, that is, the pump energy absorbed by the rare earth doped optical fiber amplifier is generally increased by increasing the pump power launched into the optical fiber amplifier. One factor that has limited an increase in the gain is the output power provided by commercially available pump lasers employed in the manufacture of rare earth doped optical fiber amplifiers. A problem with simply increasing the power of the pump laser has been that it decreases the lifetime of the pump laser significantly. This has led to the utilization of multiple pump lasers with rare earth doped optical fiber amplifiers. For instance, one scheme of increasing pump laser power has been to utilize a bidirectional pumping configuration, which involves the use of two pump lasers pumping in opposite directions, with each pump laser having a different wavelength, for example, a 980 nanometer pump laser at the input end of the rare earth doped optical fiber and a 1480 nanometer pump laser at the opposite output end of the rare earth doped optical fiber. The use of a pump laser at the input end of an optical fiber is known as "forward pumping" or "co-pumping", that is, pumping in the same direction as that of the optical transmission signal, and the use of a pump laser at the output end of an optical fiber is known as "backward pumping" or "counter-pumping", that is, pumping in the opposite direction from that of the optical transmission signal. Alternatively, four pump lasers, two at the input end and two at the output end of the optical fiber can be utilized to increase the pump power input into the optical fiber.

In designing an optical fiber amplifier, a factor that must be taken into consideration is the generation of background noise or amplified spontaneous emission, generally referred to as ASE. ASE is a result of excited dopant atoms spontaneously returning to the ground state, and emitting a photon. Such spontaneously emitted photons are multiplied (amplified) by the optical fiber amplifier, thus resulting in background noise. The background noise figure is also increased by pump light decay along the optical fiber. Moreover, ASE cannot be entirely suppressed by increasing the input pump power given that ASE increases linearly with the gain of the optical fiber amplifier. The lowest noise figure is almost always achieved when pump light propagates in the same direction as the signal. At a typical wavelength of about 1550 nanometer, the 980 nanometer pump laser is known to provide a lower noise background in the optical fiber amplifier than the 1480 nanometer pump laser, whereas, the 1480 nanometer pump laser is known to provide a higher power efficiency than the 980 nanometer pump laser, thus, making the 980 nanometer pump laser the preferred choice for performance, particularly in view of the low noise figure that can be attained.

In light of the foregoing, it is desirable to provide a rare earth doped optical fiber amplifier that can utilize more input pump laser power. Also, it is desirable to provide a method for coupling multiple pump lasers to a rare earth doped optical fiber amplifier in order to provide high output power. Also, it is desirable to provide a configuration for efficiently coupling more pump power into a rare earth doped optical fiber amplifier. Furthermore, it is desirable to minimize loss in the optical transmission signal that is to be amplified and to minimize reflections between the multiple pump lasers utilized.

SUMMARY OF THE INVENTION

Accordingly, the present invention is directed to an opto-electronic device that substantially obviates one or more of the limitations and disadvantages of the related art. The principal advantage of the present invention is the provision of an arrangement which overcome the limitations and disadvantages of the described prior arrangements. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the opto-electronic device is a rare earth doped optical fiber amplifier for amplifying an optical transmission signal that utilizes two pump lasers having substantially different wavelengths to simultaneously co-pump, that is, forward pump power at the input end of a rare earth doped optical fiber amplifier.

Aside from the standard optical components employed in a rare earth doped optical fiber amplifier, in accordance with the present invention, the optical fiber amplifier comprises a rare earth doped optical fiber having an input end and an output end, a first pump laser for generating a first pump light having a wavelength of $\lambda_1$ and a first multiplexer having a first input port, a second input port, and an output port, and wherein the first input port is adapted to receive an optical transmission signal having a wavelength of $\lambda_t$, the second input port is optically connected to the first pump laser. The optical fiber amplifier further comprises a multiplexer/demultiplexer having a first input port, a second input port, a first output port, and a second output port, wherein the first input port is optically connected to the output port of the first multiplexer, and the second output port of the multiplexer/demultiplexer is optically connected to the input end of the optical fiber. The optical fiber amplifier also includes an optical isolator having a first end and a second end, wherein the first end of the optical isolator is optically connected to the first output port of the multiplexer/demultiplexer. Furthermore, the optical fiber amplifier includes a second pump laser for generating a second pump light having a wavelength of $\lambda_2$ and a second multiplexer having a first input port, a second input port, and an output port, wherein the first input port is optically connected to the second end of the optical isolator, and wherein the second input port is optically connected to the second pump laser, and the output port is optically connected to the second input port of the multiplexer/demultiplexer.

In one embodiment, the first multiplexer combines the optical transmission signal with the first pump light to provide a first combined output and transmits the first combined output to the first input port of the multiplexer/demultiplexer. The multiplexer/demultiplexer separates from the first combined output an optical transmission signal portion having a wavelength of $\lambda_t$, and transmits, at the first output port, the optical transmission signal portion to the first end of the optical isolator, whereas the multiplexer/demultiplexer carries through a first pump light portion having a wavelength of $\lambda_1$. The optical isolator transmits the optical transmission signal portion to the first input port of the second multiplexer. The second multiplexer combines the optical transmission signal portion with the second pump light to provide a second combined output and transmits the second combined output to the second input port of the multiplexer/demultiplexer. The multiplexer/demultiplexer combines the second combined output with the first pump light portion to provide a third combined output and transmits, at the second output port, the third combined output to the input end of the optical fiber.

In another embodiment, a method is provided for amplifying an optical transmission signal of wavelength $\lambda_t$ in an optical fiber amplifier comprising a rare earth doped optical fiber having an input end and an output end. The optical transmission signal of wavelength $\lambda_t$, a first pump light of wavelength $\lambda_1$, and a second pump light of wavelength $\lambda_2$ are all transmitted in the same direction through the optical fiber, where $|\lambda_2-\lambda_1|$ is about 500 nanometers. In the preferred embodiment, the amplifier is an erbium doped optical fiber amplifier, the optical transmission signal has a wavelength $\lambda_t$ in the range of about 1525 to 1610 nanometers, the first pump light has a wavelength $\lambda_1$ of about 980 nanometers and the second pump light has a wavelength $\lambda_2$ of about 1480 nanometers. This arrangement of the 980 nanometer and the 1480 nanometer pumps provide a total pump power into the optical fiber that is a combination of the input power of the individual pump lasers. Further, because both pump lights are propagated in the same direction as the optical transmission signal, the optical fiber amplifier has a low noise figure.

It is to be understood that both the foregoing general description and the following detailed description are exemplary and explanatory and are intended to provide further explanation of the invention as claimed.

The accompanying drawings are included to provide a further understanding of the invention, illustrating embodiments of the invention, and together with the description serve to explain the objects, advantages, and principles of the invention.

DESCRIPTION OF THE PREFERRED EMBODIMENT

The invention disclosed herein generally embodies a rare earth doped optical fiber amplifier, which incorporates a pump multiplexing scheme utilizing two pump lasers, each having a different wavelength, to provide pump power at the input end of the rare earth doped optical fiber.

Figure 1:
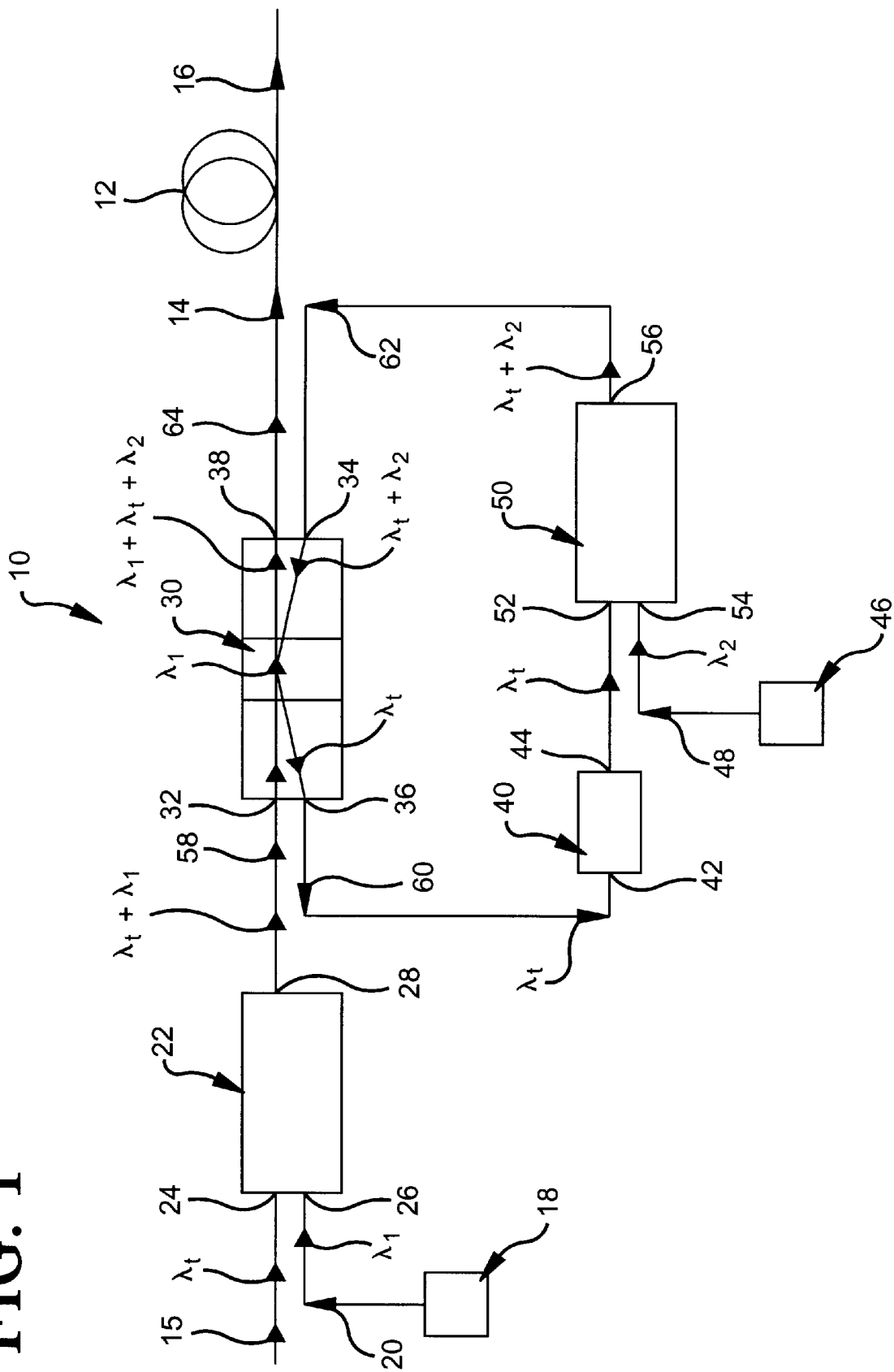
FIG. 1 is a schematic representation of a pump multiplexing scheme used in an optical fiber amplifier in accordance with an embodiment of the present invention.

An exemplary embodiment of the pump multiplexing scheme for amplifying an optical transmission signal in a rare earth doped optical fiber amplifier is shown in FIG. 1. All of the drawings, including FIG. 1 only show the pump multiplexing scheme utilized by the optical fiber amplifier and do not show the other standard components of the optical fiber amplifier. The reference numeral 10 refers only to the pump multiplexing segment of the optical fiber amplifier. The incoming optical transmission signal to be amplified is designated by reference numeral 15. As used herein, the term "multiplexer" refers to a passive optoelectronic device that combines or multiplexes two or more optical signals having different wavelengths into a "combined" signal and simultaneously transmits the combined signal in the same direction and over the same optical fiber. The term "combined signal" or "combined output" as used herein does not refer to the signals being mixed together, but rather simply refers to the linked transportation of the signals over the same optical fiber. The term "demultiplexer", as used herein, refers to a passive optoelectronic device that separates or demultiplexes the different optical signals by wavelength and delivers each signal to a particular location. Finally, as used herein, the term "multiplexer/demultiplexer" refers to a passive optoelectronic device that can multiplex signals as well as demultiplex signals. Further, as used hereinafter, the term "rare earth doped optical fiber" refers to a fiber whose core is doped with a rare earth element, which amplifies light at a certain wavelength.

As shown in FIG. 1, the pump multiplexing segment of the optical fiber amplifier 10 comprises a rare earth doped optical fiber 12 having an input end 14, where the incoming optical transmission signal 15 to be amplified is received, and an output end 16, where the amplified optical transmission signal 15 exits. The optical transmission signal 15 has a wavelength of $\lambda_t$ and is received into a first input port 24 of a first multiplexer 22. The first multiplexer 22 further comprises a second input port 26 and an output port 28. The first input port 24 and the second input port 26 are located on one side of the first multiplexer 22, whereas, the output port 28 is located on an opposite side of the first multiplexer 22. The first input port 24 of the first multiplexer 22 is adapted to receive the optical transmission signal 15, whereas, the second input port 26 is connected to a first pump laser 18, which generates a first pump light 20 having a wavelength of $\lambda_1$. The output port 28 of the first multiplexer 22 is optically connected to a first input port 32 of a multiplexer/demultiplexer 30. The multiplexer/demultiplexer 30 further includes a second input port 34, a first output port 36 and a second output port 38. Both the first input port 32 and the first output port 36 of the multiplexer/demultiplexer 30 are located on one side of the multiplexer/demultiplexer 30, whereas, both the second input port 34 and the second output port 38 are located on an opposite side of the multiplexer/demultiplexer 30. The first output port 36 of the multiplexer/demultiplexer 30 is optically connected to a first end 42 of an optical isolator 40, whereas, the second output port 38 of the multiplexer/demultiplexer 30 is optically connected to the input end 14 of the optical fiber 12. A second end 44 of the optical isolator 40 is optically connected to a first input port 52 of a second multiplexer 50. The second multiplexer 50 further includes a second input port 54 and an output port 56. The first input port 52 and the second input port 54 are located on one side of the second multiplexer 50, whereas, the output port 56 is located on an opposite side of the second multiplexer 50. The second input port 54 of the second multiplexer 50 is optically connected to a second pump laser 46, which generates a second pump light 48 having a wavelength of $\lambda_2$. The output port 56 of the second multiplexer 50 is optically connected to the second input port 34 of the multiplexer/demultiplexer 30. Also, as shown in FIG. 1, both the first multiplexer 22 and the multiplexer/demultiplexer 30 are connected in series to the input end 14 of the optical fiber 12, whereas, each of the optical isolator 40 and the second multiplexer 50 is connected in parallel to the multiplexer/demultiplexer 30.

Basically, the optical transmission signal 15 serially traverses sequentially each of, first, the first multiplexer 22, then the multiplexer/demultiplexer 30, the second multiplexer 50, then a second time through the multiplexer/demultiplexer 30, and finally into the input end 14 of the optical fiber 12 of the optical fiber amplifier 10. More specifically, the optical amplifier 10 when constructed as described above, amplifies an optical transmission signal 15, as follows. The first multiplexer 22 receives the optical transmission signal 15 having a wavelength of $\lambda_t$ through the first input port 24 and receives the first pump light 20 having a wavelength of $\lambda_1$ through the second input port 26. The first multiplexer 22 combines the optical transmission signal 15 and the first pump light 20 to provide a first combined output 58 having an aggregate wavelength of $\lambda_t$ and $\lambda_1$. The first combined output 58 is then transmitted from the first multiplexer 22, at the output port 28, to the first input port 32 of the multiplexer/demultiplexer 30. The first input port 32 of the multiplexer/demultiplexer 30 receives the first combined output 58 and separates from the first combined output 58 an optical transmission signal portion 60 having a wavelength of $\lambda_t$ and the multiplexer/demultiplexer 30 transmits the optical transmission signal portion 60, at the first output port 36, to the first end 42 of the optical isolator 40. Furthermore, the multiplexer/demultiplexer 30 carries through a first pump light portion 61 having a wavelength of $\lambda_1$. The second multiplexer 50 receives the optical transmission signal portion 60 through the first input port 52 and receives the second pump light 48 having a wavelength of $\lambda_2$ through the second input port 54. The second multiplexer 50 combines the optical transmission signal portion 60 and the second pump light 48 to provide a second combined output 62 having an aggregate wavelength of $\lambda_t$ and $\lambda_2$. The second combined output 62 is then transmitted from the second multiplexer 50, at the output port 56, to the second input port 34 of the multiplexer/demultiplexer 30. The multiplexer/demultiplexer 30 combines the second combined output 62 with the first pump light portion 61 to provide a third combined output 64 having an aggregate wavelength of $\lambda_t$, $\lambda_1$ and $\lambda_2$. The multiplexer/demultiplexer 30 then transmits, at the second output port 38, the third combined output 64 to the input end 14 of the optical fiber 12. Transmitting both the first pump light 20 and the second pump light 48 to the input end 14 of the optical fiber 12, ensures that the optical fiber is pumped, at the input end, with power from both the first pump laser 18 and the second pump laser 46.

Figure 2:
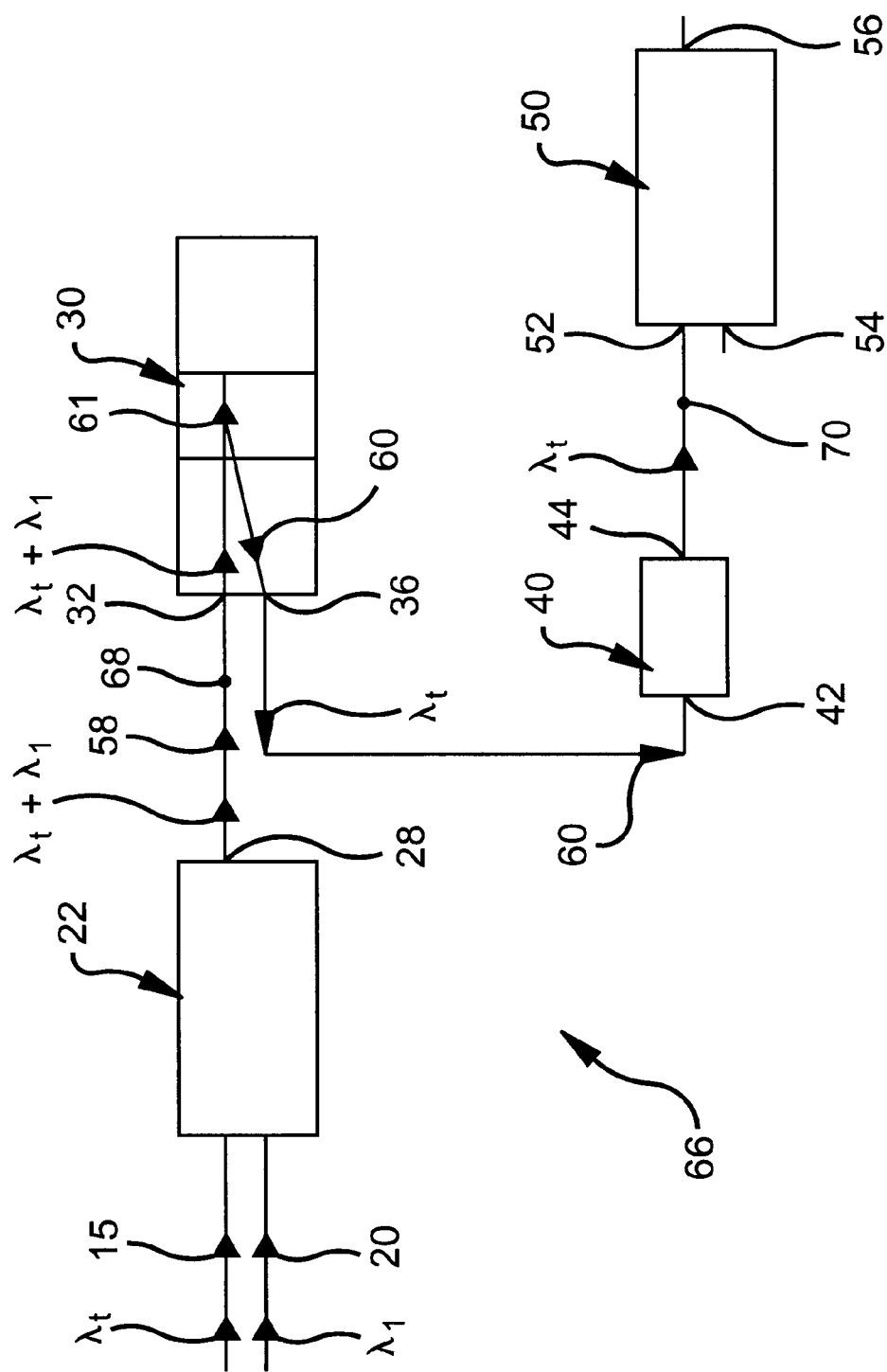
FIG. 2 is a partial schematic representation of a first transmission path of an optical transmission signal through the pump multiplexing scheme shown in FIG. 1.

FIG. 2 is a partial schematic of a first transmission path taken by an optical transmission signal 15, which path is designated generally by reference numeral 66. The first transmission path has a first end 68 and a second end 70. The first end 68 of the first transmission path 66 is optically connected to the output port 28 of the first multiplexer 22, whereas, the second end 70 of the first transmission path 66 is optically connected to the first input port 52 of the second multiplexer 50. The first transmission path 66 only shows the optical pathway of the first combined output 58 from the output port 28 of the first multiplexer 22 through to the second multiplexer 50. As shown in FIG. 2, the first combined output 58 first enters the first input port 32 of the multiplexer/demultiplexer 30. The multiplexer/demultiplexer 30 separates from the first combined output 58 an optical transmission signal portion 60 having a wavelength of $\lambda_t$ and transmits the optical transmission signal portion 60 to the first end of the optical isolator 40. Further, the multiplexer/demultiplexer 30 carries through a first pump light portion 61 having a wavelength of $\lambda_1$. Furthermore, the optical transmission signal portion 60 is transmitted through the first end 42 and then the second end 44 of the optical isolator 40.

Figure 3:
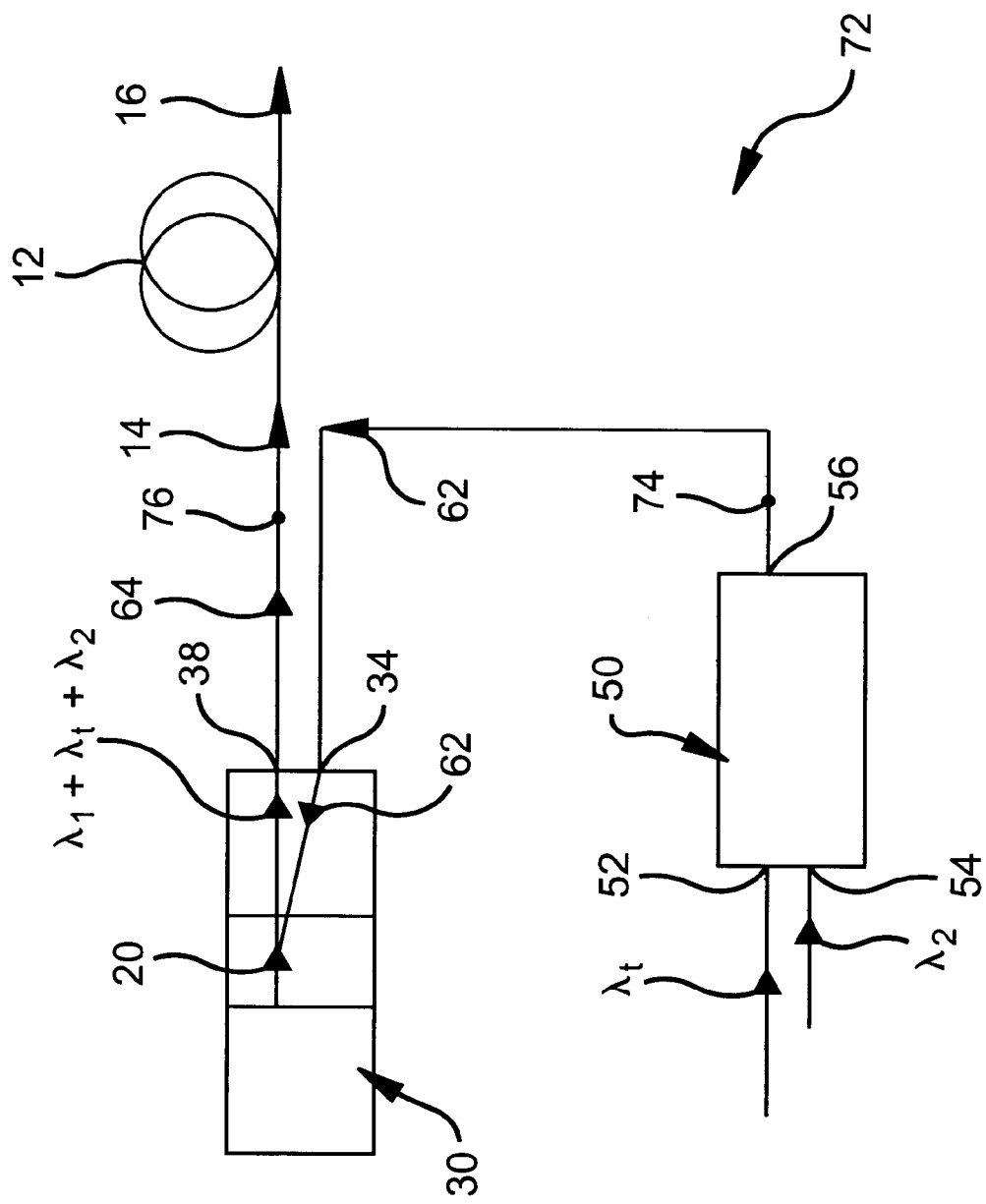
FIG. 3 is a partial schematic representation of a second transmission path of the optical transmission signal through the pump multiplexing scheme shown in FIG. 1.

The optical transmission signal portion 60 having a wavelength of $\lambda_t$ is transmitted next to the first input port 52 of the second multiplexer 50, which combines the optical transmission signal portion 60 with the second pump light 48 having a wavelength of $\lambda_2$ to provide a second combined output 62 having an aggregate wavelength of $\lambda_t$ and $\lambda_2$. Subsequently, as shown in FIG. 3, the second combined output 62 exits at the output port 56 of the second multiplexer 50 and travels down a second transmission path, which path is designated generally by the reference numeral 72. The second transmission path 72 has a first end 74 and a second end 76. The first end 74 of the second transmission path 72 is optically connected to the output port 56 of the second multiplexer 50, whereas, the second end 76 is optically connected to the input end 14 of the optical fiber 12. The second transmission path 72 shows the portion of the pathway from the output port 56 of the second multiplexer 50 to the input end 14 of the optical fiber. As shown in FIG. 3, the second combined output 62 is transmitted to the second input port 34 of the multiplexer/demultiplexer 30. The multiplexer/demultiplexer 30 combines the second combined output 62 with the first pump light portion 61 to provide a third combined output 64 having an aggregate wavelength of $\lambda_t$, $\lambda_1$ and $\lambda_2$. The multiplexer/demultiplexer 30 then transmits, at the second output port 38, the third combined output 64 to the input end 14 of the optical fiber 12. An optical fiber amplifier utilizing the pump multiplexing segment 10 of the present invention benefits from the use of both a 980 pump laser, which ensures a low noise figure, and the use of a 1480 nanometer pump laser, which ensures high power efficiency.

The invention further includes the method of making the apparatus described herein and in using the apparatus in an optical telecommunication system. In particular, a method is provided for amplifying an optical transmission signal 15 in an optical fiber amplifier 10 by transmitting, in the same direction, each of the transmission signal 15 having a wavelength of $\lambda_t$, a first pump light 20 having a wavelength of $\lambda_1$, and a second pump light 48 having a wavelength of $\lambda_2$ into the input end 14 of a rare earth doped optical fiber 12, where $|\lambda_2-\lambda_1|$ is about 500 nanometers. The method includes transmitting simultaneously the first pump light 20 and the second pump light 48 into the input end 14 of the rare earth doped optical fiber 12. Furthermore, the method includes combining the optical transmission signal 15 and the first pump light 20, in a first multiplexer 22, to provide a first combined output 58, and transmitting the first combined output 58 to a first input port 32 of a multiplexer/demultiplexer 30. The method further includes separating from the first combined output 58, in a multiplexer/demultiplexer 30, an optical transmission signal portion 60 having a wavelength of $\lambda_t$ and transmitting the optical transmission signal portion 60, first, to an optical isolator 40 and then to a second multiplexer 50, while carrying through a first pump light portion 61 having a wavelength of $\lambda_1$. Furthermore, the method includes combining, in the second multiplexer 50, the optical transmission signal portion 60 with the second pump light 48 to provide a second combined output 62 and transmitting the second combined output 62 to a second input port 34 of the multiplexer/demultiplexer 30. The method provides for the multiplexer/demultiplexer 30 combining the second combined output 62 with the first pump light portion 61 to provide a third combined output 64 and transmitting the third combined output 64 to the input end 14 of the rare earth doped optical fiber 12.

In the preferred embodiment, the rare earth doped optical fiber amplifier 10 is an erbium doped optical fiber amplifier and the optical transmission signal 15 has a wavelength $\lambda_t$ in the range of about 1525 to 1610 nanometers. Furthermore, $|\lambda_2-\lambda_1|$ is preferably greater than 100 nanometers and most preferably about 500 nanometers. In the preferred embodiment, the first pump laser 18 is a commercially available laser diode that provides a first pump light 20 having a wavelength $\lambda_1$ of about 980 nanometers, whereas, the second pump laser 46 is also a commercially available laser diode that provides a second pump light 48 having a wavelength $\lambda_2$ of about 1480 nanometers. Also, in the preferred embodiment, the first multiplexer 22 is a commercially available 980/1550 wavelength-division multiplexer coupler, model number FG-WDM05, sold by Corning Incorporated; the second multiplexer 50 is a commercially available 1480/1550 wavelength-division multiplexer coupler, model number WD 1415-COT8441, sold by JDS FITEL Inc., and the multiplexer/demultiplexer 30 is also a JDS brand 980/1550 wavelength-division multiplexer coupler, model number WD915-4P-COR, sold by JDS FITEL Inc. In the preferred embodiment, the optical isolator 40 is a commercially available Etek isolator, model number PIFI2CG711100. In general, an optical isolator is a unidirectional light transmitting device that prevents back-reflections and noise from reaching the other optical components in an optical fiber amplifier.

Although a preferred embodiment of this invention has been described herein, various modifications and variations of the invention will be apparent to those skilled in the art without departing from the spirit or scope of the invention. Thus, it is intended that the present invention cover the modifications and variations of this invention provided they come within the scope of the appended claims and their equivalents.

What is claimed is:

1. An optical fiber amplifier for amplifying an optical transmission signal having a wavelength of $\lambda_t$, comprising:
    a rare earth doped optical fiber having an input end and an output end;
    a first pump laser for generating a first pump light having a wavelength of $\lambda_1$;
    a first multiplexer having a first input port, a second input port, and an output port, said first input port being adapted to receive said optical transmission signal, said second input port being optically connected to said first pump laser;
    a multiplexer/demultiplexer having a first input port, a second input port, a first output port, and a second output port, said first input port being optically connected to said output port of said first multiplexer, said second output port of said multiplexer/demultiplexer being optically connected to said input end of said rare earth doped optical fiber;
    an optical isolator having a first end and a second end, said first end of said optical isolator being optically connected to said first output port of said multiplexer/demultiplexer;
    a second pump laser for generating a second pump light having a wavelength of $\lambda_2$; and
    a second multiplexer having a first input port, a second input port, and an output port, said first input port being optically connected to said second end of said optical isolator, said second input port being optically connected to said second pump laser, said output port being optically connected to said second input port of said multiplexer/demultiplexer.

2. The optical fiber amplifier of claim 1, wherein said rare earth doped optical fiber comprises an erbium doped optical fiber.

3. The optical fiber amplifier of claim 1, wherein said wavelength $\lambda_t$ is in the range of about 1525 to 1610 nanometers.

4. The optical fiber amplifier of claim 1, wherein $|\lambda_2-\lambda_1|$ is about 500 nanometers.

5. The optical fiber amplifier of claim 1, wherein said wavelength $\lambda_1$ is about 980 nanometers, and wherein said wavelength $\lambda_2$ is about 1480 nanometers.

6. The optical fiber amplifier of claim 1, wherein said first multiplexer, said second multiplexer and said multiplexer/demultiplexer each comprise a wavelength-division multiplexing coupler.

7. The optical fiber amplifier of claim 1, wherein said first multiplexer combines said optical transmission signal and said first pump light to provide a first combined output and wherein said first multiplexer transmits, at said output port, said first combined output to said multiplexer/demultiplexer.

8. The optical fiber amplifier of claim 7, wherein said multiplexer/demultiplexer separates from said first combined output an optical transmission signal portion having a wavelength of $\lambda_t$, and transmits, at said first output port, said optical transmission signal portion to said optical isolator and then to said first input port of said second multiplexer, and wherein said multiplexer/demultiplexer carries through a first pump light portion having a wavelength of $\lambda_1$.

9. The optical fiber amplifier of claim 8, wherein said second multiplexer combines said optical transmission signal portion and said second pump light to provide a second combined output and wherein said second multiplexer, at said output port, transmits said second combined output to said second input port of said multiplexer/demultiplexer.

10. The optical fiber amplifier of claim 9, wherein said multiplexer/demultiplexer combines said second combined output with said first pump light portion to provide a third combined output and wherein said multiplexer/demultiplexer transmits, at said second output port, said third combined output to said input end of said rare earth doped optical fiber.

11. An optical fiber amplifier, comprising:
a rare earth doped optical fiber having an input end and an output end;
a first multiplexer having two input ports and one output port, one of said input ports being adapted to receive an optical transmission signal having a wavelength of $\lambda_t$, the other of said input ports being adapted to receive a first pump light having a wavelength of $\lambda_1$, and wherein said output port transmits a first combined output comprising said optical transmission signal and said first pump light;
a first transmission path having a first end and a second end, said first end being optically connected to said output port of said first multiplexer;
a second multiplexer having two input ports and one output port, one of said input ports being adapted to receive an optical transmission signal portion from said second end of said first transmission path, the other of said input ports being adapted to receive a second pump light having a wavelength of $\lambda_2$, and wherein said output port transmits a second combined output comprising said optical transmission signal portion and said second pump light; and
a second transmission path having a first end and a second end, said first end being optically connected to said output port of said second multiplexer, and said second end being optically connected to said input end of said rare earth doped optical fiber, wherein said rare earth doped optical fiber is an erbium doped optical fiber, and wherein said wavelength $\lambda_t$ is in the range of about 1525 to 1610 nanometers, and wherein said wavelength $\lambda_1$ is about 980 nanometers, and wherein said wavelength $\lambda_2$ is about 1480 nanometers.

12. The optical fiber amplifier of claim 11, wherein said first multiplexer, said second multiplexer each comprise a wavelength-division multiplexing coupler.

13. An optical fiber amplifier, comprising:
a rare earth doped optical fiber having an input end and an output end;
a first multiplexer having two input ports and one output port, one of said input ports being adapted to receive an optical transmission signal having a wavelength of $\lambda_t$, the other of said input ports being adapted to receive a first pump light having a wavelength of $\lambda_1$, and wherein said output port transmits a first combined output comprising said optical transmission signal and said first pump light;
a first transmission path having a first end and a second end, said first end being optically connected to said output port of said first multiplexer;
a second multiplexer having two input ports and one output port, one of said input ports being adapted to receive an optical transmission signal portion from said second end of said first transmission path, the other of said input ports being adapted to receive a second pump light having a wavelength of $\lambda_2$, and wherein said output port transmits a second combined output comprising said optical transmission signal portion and said second pump light; and
a second transmission path having a first end and a second end, said first end being optically connected to said output port of said second multiplexer, and said second end being optically connected to said input end of said rare earth doped optical fiber, wherein said first transmission path comprises a multiplexer/demultiplexer having two input ports and two output ports, wherein the first of said input ports is optically connected to said output port of said first multiplexer, and wherein, the first of said output ports is optically connected to a first end of an optical isolator, and wherein a second end of said optical isolator is optically connected to said second multiplexer.

14. The optical fiber amplifier of claim 13, wherein said second transmission path comprises said multiplexer/demultiplexer, wherein the second of said input ports is optically connected to said output port of said second multiplexer, and wherein the second of said output ports is optically connected to said input end of said rare earth doped optical fiber.

15. The optical fiber amplifier of claim 13, wherein said multiplexer/demultiplexer separates from said first combined output an optical transmission signal portion having a wavelength of $\lambda_t$ and transmits said optical transmission signal portion to said optical isolator and then to said second multiplexer, and wherein said multiplexer/demultiplexer carries through a first pump light portion having a wavelength of $\lambda_1$, and wherein said second multiplexer combines said optical transmission signal portion with said second pump light to provide a second combined output that is transmitted to said second input port of said multiplexer/demultiplexer.

16. The optical fiber amplifier of claim 15, wherein said multiplexer/demultiplexer combines said second combined output with said first pump light portion to provide a third combined output and transmits, at said second output port, said third combined output to said input end of said rare earth doped optical fiber.

17. An optical fiber amplifier for amplifying an optical transmission signal having a wavelength of $\lambda_t$, comprising:
a rare-earth doped optical fiber having an input end;
a first multiplexer;
a multiplexer/demultiplexer serially connecting said first multiplexer and said input end of said optical fiber;
a second multiplexer connected in parallel to said multiplexer/demultiplexer;
wherein said optical transmission signal serially traverses sequentially each of, first, said first multiplexer, then said multiplexer/demultiplexer, then said second multiplexer, then said multiplexer/demultiplexer a second time and then said input end of said optical fiber.

18. An optical signal processing circuit comprising:
a first multiplexer having at least two input ports and an output port;
a multiplexer/demultiplexer having at least two input ports and two output ports, one of said input ports of said multiplexer/demultiplexer being connected to said output port of said first multiplexer; and
a second multiplexer having at least two input ports and an output port, one of said input ports being connected to one of said output ports of said multiplexer/demultiplexer, said output port of said second multiplexer being connected to the second of said input ports of said multiplexer/demultiplexer.

19. A method of amplifying an optical transmission signal having a wavelength of $\lambda_t$ in an optical fiber amplifier, said method comprising the steps of:

providing a rare earth doped optical fiber having an input end and an output end;

transmitting, in the same direction, each of said optical transmission signal of wavelength $\lambda_t$, a first pump light of wavelength $\lambda_1$, and a second pump light of wavelength $\lambda_2$ into said input end of said rare earth doped optical fiber, wherein $|\lambda_2-\lambda_1|$ is about 500 nanometers, combining said optical transmission signal and said first pump light in a first multiplexer to provide a first combined output;

transmitting said first combined output to a multiplexer/demultiplexer; separating from said first combined output in said multiplexer/demultiplexer an optical transmission signal portion having a wavelength of $\lambda_t$ and transmitting said optical transmission signal portion, first, to an optical isolator and then to a second multiplexer; and carrying through a first pump light portion having a wavelength of $\lambda_1$.

20. The method of claim 19, further comprising the steps of:

combining in said second multiplexer said optical transmission signal portion with said second pump light to provide a second combined output; and transmitting said second combined output to said second input port of said multiplexer/demultiplexer.

21. The method of claim 20, further comprising the steps of:

combining said second combined output with said first pump light portion to provide a third combined output; and transmitting said third combined output to said input end of said rare earth doped optical fiber.

22. A method of amplifying an optical transmission signal in an optical fiber amplifier, said method comprising the steps of:

a. providing a rare earth doped optical fiber having an input end and an output end;

b. combining said optical transmission signal having a wavelength of $\lambda_t$ and a first pump light having a wavelength of $\lambda_1$ to provide a first combined output;

c. separating from said first combined output an optical transmission signal portion having a wavelength of $\lambda_t$ and carrying through a first pump light portion having a wavelength of $\lambda_1$;

d. combining said optical transmission signal portion with a second pump light having a wavelength of $\lambda_2$ to provide a second combined output;

e. combining said second combined with said first pump light portion to provide a third combined output; and f. transmitting said third combined output to said input end of said optical fiber.

23. The method of claim 22, wherein said rare earth doped optical fiber is an erbium doped optical fiber.

24. The method of claim 22, further comprising transmitting an optical transmission signal having a wavelength $\lambda_t$ in the range of about 1525 to 1610 nanometers, and transmitting simultaneously a first pump light having a wavelength $\lambda_1$ of about 980 nanometers and a second pump light having a wavelength $\lambda_2$ of about 1480 nanometers.

25. The method of claim 22, wherein said step b further comprises:

combining, in a first multiplexer, said optical transmission signal having said wavelength of $\lambda_t$ and said first pump light having said wavelength of $\lambda_1$ to provide said first combined output, and transmitting said first combined output to said multiplexer/demultiplexer.

26. The method of claim 22, wherein said step c further comprises:

separating from said first combined output, in a multiplexer/demultiplexer, said optical transmission signal portion having a wavelength of $\lambda_t$ and transmitting said optical transmission signal portion, first, to an optical isolator and then to a second multiplexer.

27. The method of claim 22, wherein said step d further comprises:

transmitting said second combined output from said second multiplexer to said multiplexer/demultiplexer.

28. The method of claim 22, wherein said step e further comprises:

combining, in said multiplexer/demultiplexer, said second combined output with said first pump light portion to provide a third combined output.

* * * * *